United States Patent
Luo et al.

(10) Patent No.: US 10,965,982 B2
(45) Date of Patent: Mar. 30, 2021

(54) METHOD AND APPARATUS FOR SYNCHRONOUSLY PLAYING IMAGE AND AUDIO

(71) Applicant: BAIDU ONLINE NETWORK TECHNOLOGY (BEIJING) CO., LTD., Beijing (CN)

(72) Inventors: Xing Luo, Beijing (CN); Guanghao Shen, Beijing (CN); Xufei Jiang, Beijing (CN); Xiuzhong Gu, Beijing (CN); Yangyang Zhang, Beijing (CN); Fang Duan, Beijing (CN); Wuchen Chen, Beijing (CN); Qingchang Hao, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 154 days.

(21) Appl. No.: 16/175,617

(22) Filed: Oct. 30, 2018

(65) Prior Publication Data

US 2019/0297374 A1 Sep. 26, 2019

(30) Foreign Application Priority Data

Mar. 26, 2018 (CN) .......................... 2018 1 0251988

(51) Int. Cl.
*H04N 7/173* (2011.01)
*H04N 21/43* (2011.01)
(Continued)

(52) U.S. Cl.
CPC ..... *H04N 21/4307* (2013.01); *H04N 21/2393* (2013.01); *H04N 21/242* (2013.01); *H04N 21/435* (2013.01)

(58) Field of Classification Search
CPC .......... H04N 21/4307; H04N 21/2393; H04N 21/242; H04N 21/435
See application file for complete search history.

(56) References Cited

U.S. PATENT DOCUMENTS

2010/0312559 A1 12/2010 Jin et al.
2011/0289048 A1* 11/2011 Doi .................. H04N 21/85406
707/610
(Continued)

*Primary Examiner* — Kyu Chae
(74) *Attorney, Agent, or Firm* — MARSHALL, GERSTEIN & BORUN LLP

(57) ABSTRACT

A method and apparatus for synchronously playing an image and an audio are provided. The method comprises: acquiring a play service request sent by a broadcast terminal; acquiring play image data and audio data corresponding to the play service request, the play image data being divided into a plurality of groups based on played content; and sending the play image data, the audio data, and information for determining a first corresponding relationship between each of the groups and an attribute of the audio data to the broadcast terminal, to enable the broadcast terminal to perform synchronization on the play image data and the audio data correspondingly to synchronously play the play image data and the audio data. Establishing the corresponding relationship between the audio data and the played content of each of the groups enables the broadcast terminal to accurately synchronize the played audio content and the displayed play image.

22 Claims, 10 Drawing Sheets

(51) Int. Cl.
*H04N 21/239* (2011.01)
*H04N 21/242* (2011.01)
*H04N 21/435* (2011.01)

(56) References Cited

U.S. PATENT DOCUMENTS

2015/0304705 A1* 10/2015 Duong ................ G06F 16/7834
 386/241
2017/0195384 A1* 7/2017 Han ........................ H04L 69/22

* cited by examiner

METHOD AND APPARATUS FOR SYNCHRONOUSLY PLAYING IMAGE AND AUDIO

CROSS-REFERENCE TO RELATED APPLICATIONS

This application claims priority to Chinese Patent Application No. 201810251988.7, filed in China on Mar. 26, 2018, the content of which is incorporated herein by reference in its entirety.

TECHNICAL FIELD

The disclosure relates to the field of computer technology, specifically to the field of artificial intelligence, and more specifically to a method and apparatus for synchronously playing an image and an audio.

BACKGROUND

With the information digitization and the improvement of living standards, smart homes increasingly appear in daily life. As a type of products thereof, smart speakers have attracted wide attentions from the public.

Some existing smart speakers are equipped with display screens for displaying relevant information. However, the existing smart speakers usually can achieve synchronization between played contents and displayed characters merely by pre-storing audio files and text files and pre-annotating corresponding relationships between the played contents and displayed characters of the audio files, such as displaying lyrics whilst listening to songs. However, for characters and image information acquired in real time, accurate synchronization cannot be achieved during broadcast, thereby resulting in poor product experience among users. Therefore, how to improve the accuracy in synchronizing an image or characters, and an audio becomes a technical problem in urgent need of solution.

SUMMARY

The disclosure provides a method and apparatus for synchronously playing an image and an audio, to solve the defects, such as failure to accurately synchronously playing a technical image and an audio in the existing technologies.

A first aspect of the disclosure is to provide a method for synchronously playing an image and an audio, including:

acquiring a play service request sent by a broadcast terminal;

acquiring play image data and audio data corresponding to the play service request, the play image data being divided into a plurality of groups based on played content; and sending the play image data, the audio data, and information for determining a first corresponding relationship between each of the groups and an attribute of the audio data to the broadcast terminal, to enable the broadcast terminal to perform, based on the first corresponding relationship, synchronization on the play image data and the audio data correspondingly to synchronously play the play image data and the audio data.

A second aspect of the disclosure is to provide a method for synchronously playing an image and an audio, including:

sending a play service request to a server, and receiving play image data, audio data, and information for determining a first corresponding relationship between each of a plurality of groups and an attribute of the audio data returned by the server based on the play service request, the play image data being divided into the plurality of groups based on played content; and performing, based on the first corresponding relationship, synchronization on the played audio data and the play image data displayed on a display interface correspondingly.

A third aspect of the disclosure provides a server, including:

a first acquisition module, for acquiring a play service request sent by a broadcast terminal;

a second acquisition module, for acquiring play image data and audio data corresponding to the play service request, the play image data being divided into a plurality of groups based on played content; and a first sending module, for sending the play image data, the audio data, and information for determining a first corresponding relationship between each of the groups and an attribute of the audio data to the broadcast terminal, to enable the broadcast terminal to perform, based on the first corresponding relationship, synchronization on the play image data and the audio data correspondingly to synchronously play the play image data and the audio data.

A fourth aspect of the disclosure provides a broadcast terminal, including:

a second sending module, sending a play service request to a server;

a receiving module, for receiving play image data, audio data, and information for determining a first corresponding relationship between each of a plurality of groups and an attribute of the audio data returned by the server based on the play service request; the play image data being divided into the plurality of groups based on played content; and a processing module, for performing, based on the first corresponding relationship, synchronization on the played audio data and the play image data displayed on a display interface correspondingly.

A fifth aspect of the disclosure provides a server, including: at least one processor and a memory;

the memory storing a computer program; the at least one processor executing the computer program stored in the memory, to implement the method according to the first aspect.

A sixth aspect of the disclosure provides a broadcast terminal, including: a processor and a memory;

the memory storing a computer program; the processor executing the computer program stored in the memory, to implement the method according to the second aspect.

A seventh aspect of the disclosure provides a computer readable storage medium, the computer readable storage medium storing a computer program therein, the computer program implementing, when executed, the method according to the first aspect.

An eighth aspect of the disclosure provides a computer readable storage medium, the computer readable storage medium storing a computer program therein, the computer program implementing, when executed, the method according to the second aspect.

The method and apparatus for synchronously playing an image and an audio provided by the disclosure divide play image data into a plurality of groups based on played content, and send information for determining a first corresponding relationship between each of the groups and an attribute of the audio data to a broadcast terminal, to enable the broadcast terminal to perform, based on the first corresponding relationship, synchronization on the play image data and the audio data correspondingly to synchronously play the play image data and the audio data. Establishing the corresponding relationship between the audio data and the played content of the each of the groups enables the broadcast terminal to accurately synchronize the broadcast audio data and the displayed play image during playing, thereby improving the accuracy in synchronizing audio broadcast and screen display.

BRIEF DESCRIPTION OF THE DRAWINGS

To more clearly describe the technical solution of the embodiments of the disclosure or the existing technologies, the accompany drawings to be used in the description on the embodiments or the existing technologies will be briefly introduced hereinbelow. Apparently, the accompanying drawings described hereinbelow are some embodiments of the disclosure. For those skilled in the art, other drawings may also be obtained according to these drawings without inventive efforts.

Specific embodiments of the disclosure have been shown through the above drawings, and will be described in more detail hereinafter. The drawings and literal description are intended to show concepts of the disclosure for those skilled in the art by referring to specific embodiments, rather than to limit the scope of conception of the disclosure in any way.

DETAILED DESCRIPTION OF EMBODIMENTS

To make the objectives, the technical solution and the advantages of the embodiments of the disclosure clearer, the technical solution of the embodiments of the disclosure will be clearly and completely described hereinafter with reference to the accompanying drawings in the embodiments of the disclosure. Apparently, the embodiments described below are a part, instead of all, of the embodiments of the disclosure. Based on the embodiments of the disclosure, all other embodiments obtained by those skilled in the art without inventive efforts fall within the scope of protection of the disclosure.

First, terms involved in the disclosure are defined:

The broadcast terminal refers to a smart terminal that has a speaker and a display screen, can realize audio broadcast and screen display, and includes, but is not limited to, a screen-bearing smart speaker, a smart phone, a tablet computer, and the like.

Furthermore, the terms, such as "first", and "second", are only used for the purpose of description, but should not be understood as an indication or implication of a relative importance or an implied indication of a number of indicated technical characteristics. Unless otherwise defined explicitly specifically, the term "a plurality of" means more than two in the description on the embodiments hereinafter.

Specific embodiments hereinafter may be mutually combined. Identical or similar concepts or processes may not be repeated any more in some embodiments. The embodiments of the disclosure will be described hereinafter in conjunction with the accompanying drawings.

Figure 1:
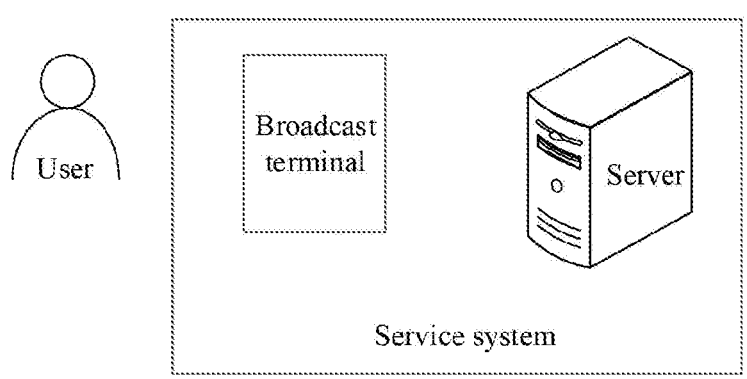
FIG. 1 is a schematic diagram of a structure of a service system according to an embodiment of the disclosure.

The method for synchronously playing an image and an audio according to an embodiment of the disclosure is suitable for a service system including a broadcast terminal and a server, as shown in FIG. 1, which is a schematic diagram of a structure of a service system according to an embodiment of the disclosure. A user may input a play service request into a broadcast terminal using an input approach, such as voice input or manual character input. The broadcast terminal sends the play service request to a server. The server is responsible for responding to the play service request sent by the broadcast terminal, and returning corresponding response data to the broadcast terminal. The broadcast terminal performs the synchronous play accordingly based on the response data.

Embodiment 1

The embodiment provides a method for synchronously playing an image and an audio, for synchronously playing an audio broadcast and a display content in a play service, and improving the accuracy in synchronization. The executive subject in the embodiment may be a server.

Figure 2:
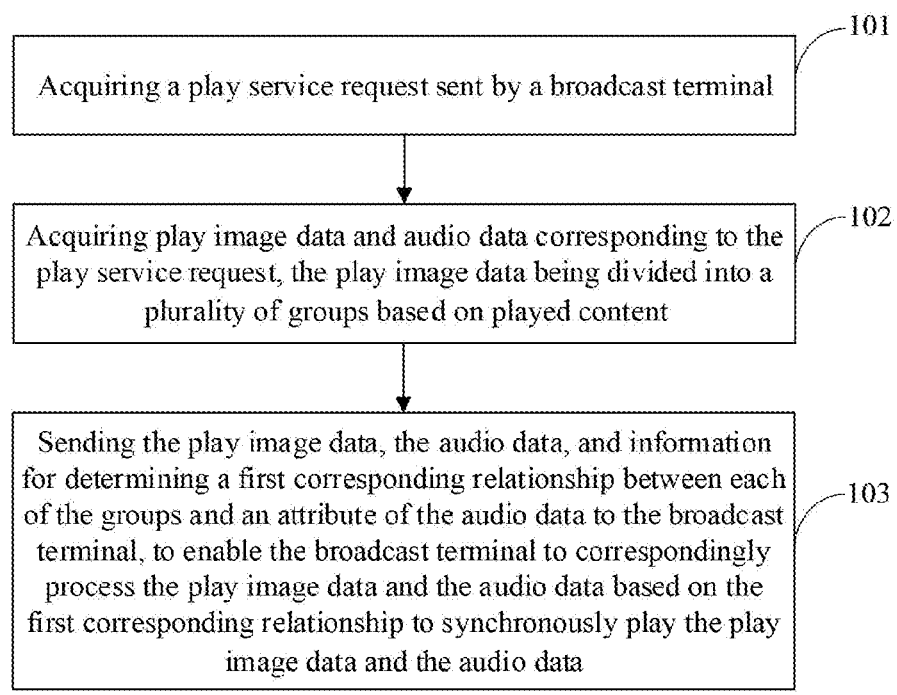
FIG. 2 is a schematic diagram of a flow of a method for synchronously playing an image and an audio according to a first embodiment of the disclosure.

FIG. 2 shows a schematic diagram of a process of a method for synchronously playing an image and an audio according to the embodiment. The method includes:

step 101: acquiring a play service request sent by a broadcast terminal.

Specifically, when requiring a broadcast service, a user may input a play service request into a broadcast terminal using an input approach, such as voice input or manual character input. The broadcast terminal sends the play service request to a server. The server may acquire the play service request sent by the broadcast terminal.

Alternatively, the play service request specifically may be, but is not limited to, a weather forecast service request, an alarm service request, a restaurant introduction service request, a SMS reading service request, a geographical location service request, and the like. For example, a user requests a smart speaker to broadcast weather by voice. The smart speaker receives audio request information from the user. The smart speaker may directly forward the audio request information to a server, or may convert the audio request information into text information, and then forward the text information to the server, which is not limited in the embodiment.

step 102: acquiring play image data and audio data corresponding to the play service request, the play image data being divided into a plurality of groups based on played content.

Specifically, after acquiring the play service request sent by the broadcast terminal, the server may acquire play image data and audio data corresponding to the play service request, the play image data being divided into a plurality of groups based on played content.

Alternatively, the play image data may include at least one of image data or literal data, and are divided into a plurality of groups based on the played content, such as an image associated with warning, an image associated with temperature, and an image associated with air quality. The image data may be an image or a video. The audio data are to-be-played audio data corresponding to the play service request.

Alternatively, the server may analyze the play service request to obtain an indication of a user intention, and acquire the play image data and the audio data corresponding to the play service request by search in a service system based on the user intention. Alternatively, the service may further acquire the play image data and the audio data corresponding to the play service request based on the user intention from a third party service system, with the help of a third party service. This is not limited in the embodiment.

Alternatively, the server acquiring the audio data corresponding to the play service request specifically may further include acquiring literal content corresponding to the play service request, and generate the audio data corresponding to the play service request based on the literal content. This is not limited in the embodiment.

Alternatively, the play image data being divided into a plurality of groups based on the played content may include: grouping based on different events of the played content, grouping based on a duration of playing the played content, grouping based on a played content size, and the like, which is not specifically limited.

As an example, taking a weather report as an example, if played content of audio data includes "a yellow warning for icy roads has been issued today in Xi'an. It is overcast to cloudy throughout the day. The temperature is −8° C. to 1° C. Severe pollution with an air quality index of 276," i.e., the play image data includes an image associated with warning, an image associated with the temperature, and an image associated with the air quality of Xi'an today, then the played content is divided into three groups. The image associated with the warning corresponds to the broadcast content "a yellow warning for icy roads has been issued today in Xi'an," the image associated with the temperature corresponds to the broadcast content "It is overcast to cloudy throughout the day. The temperature is −8° C. to 1° C.," and the image associated with the air quality corresponds to "Severe pollution with an air quality index of 276."

step 103: sending the play image data, the audio data, and information for determining a first corresponding relationship between each of the groups and an attribute of the audio data to the broadcast terminal, to enable the broadcast terminal to perform, based on the first corresponding relationship, synchronization on the play image data and the audio data correspondingly to synchronously play the play image data and the audio data.

Specifically, after acquiring the play image data and the audio data corresponding to the play service request, the server may send the play image data, the audio data, and information for determining a first corresponding relationship between each of the groups and the attribute of the audio data to the broadcast terminal, to enable the broadcast terminal to perform, based on the first corresponding relationship, synchronization on the play image data and the audio data correspondingly to synchronously play the play image data and the audio data. As an example, the attribute of the audio data may be a duration of broadcasting the audio data.

Alternatively, the information for determining the first corresponding relationship between the each of the groups and the attribute of the audio data may be acquired by the server during the search based on the user intention, or generated by the server based on specific contents of the play image data and the audio data after acquiring the play image data and the audio data.

As an example, for a weather forecast service, the server acquires weather information "a yellow warning for icy roads has been issued today in Xi'an. It is overcast to cloudy throughout the day. The temperature is −8° C. to 1° C. Severe pollution with an air quality index of 276," as well as grouping information "W: 0-13, T: 14-32, A: 33-44" and corresponding image data, from a third party weather forecast service system. The grouping information denotes: the first 13 words broadcast warning, the 14th-32nd words broadcast temperature, and the 33rd-44th words broadcast the air quality. The server groups the play image data based on the acquired grouping information.

As an example, for an alarm reminder service, the server acquires a plurality of alarm reminder service requests from a user, divides the alarm reminder service requests into groups based on different reminder time required by the user, displays different reminder contents, reminds the user by voice broadcast by specified time, and displays corresponding reminder content on a display interface.

The method for synchronously playing an image and an audio provided by the embodiment divides play image data into a plurality of groups based on played content, and sends information for determining a first corresponding relationship between each of the groups and the attribute of the audio data to a broadcast terminal, to enable the broadcast terminal to correspondingly performing synchronization on the play image data and the audio data based on the first corresponding relationship to synchronously play the play image data and the audio data. Establishing the corresponding relationship between the audio data and the played content of the each of the groups enables the broadcast terminal to accurately synchronize the broadcast audio data and the displayed play image during playing, thereby improving the accuracy in synchronizing audio broadcast and screen display.

Embodiment 2

The embodiment provides further supplementary description on the method for synchronously playing an image and an audio according to the Embodiment 1.

Figure 3:
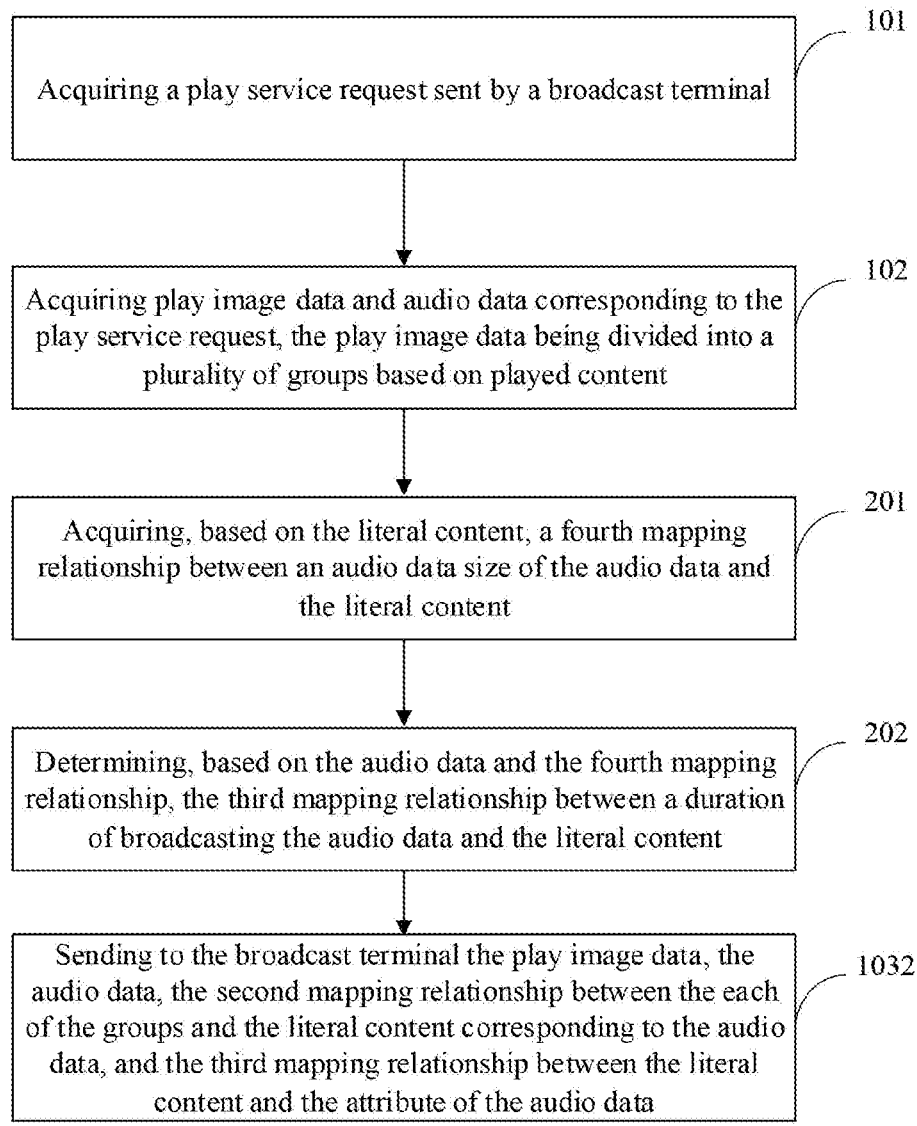
FIG. 3 is a schematic diagram of a flow of a method for synchronously playing an image and an audio according to a second embodiment of the disclosure.

FIG. 3 shows a schematic diagram of a process of a method for synchronously playing an image and an audio according to the embodiment. The schematic diagram of the process only provides an example of an integrated processing procedure, rather than limiting the disclosure, and may exclude a step or some steps in practical application. The order of the steps may also be different from the process based on the actual situation.

As an implementable way, on the basis of the Embodiment 1, alternatively, in the step 103, the information for determining the first corresponding relationship between the each of the groups and the attribute of the audio data includes: a first mapping relationship between the each of the groups and the attribute of the audio data; or a second mapping relationship between the each of the groups and literal content corresponding to the audio data, and a third mapping relationship between the literal content and the attribute of the audio data. The first corresponding relationship between the each of the groups and the attribute of the audio data may be determined by the server, and then sent to the broadcast terminal, or be determined by the broadcast terminal after the server sends the second mapping relationship between the each of the groups and the literal content corresponding to the audio data, and the third mapping relationship between the literal content and the attribute of the audio data to the broadcast terminal. That is, if the information for determining the first corresponding relationship between the each of the groups and the attribute of the audio data includes: the first mapping relationship between each of the groups and the attribute of the audio data, then the step 103 specifically includes:

step 1031: sending the play image data, the audio data, and information for determining a first corresponding relationship between the each of the groups and attribute of the audio data to the broadcast terminal.

If the information for determining the first corresponding relationship between each of the groups and the attribute of the audio data includes: the second mapping relationship between each of the groups and the literal content corresponding to the audio data, and the third mapping relationship between the literal content and the attribute of the audio data, then the step 103 specifically includes:

step 1032: sending the play image data, the audio data, the second mapping relationship between each of the groups and the literal content corresponding to the audio data, and the third mapping relationship between the literal content and the attribute of the audio data to the broadcast terminal.

Alternatively, the method may further include: sending the literal content corresponding to the audio data to the broadcast terminal, to enable the broadcast terminal to display the corresponding literal content on the display interface during broadcast.

Alternatively, before the step 103, the method may further include:

step 201: acquiring, based on the literal content, a fourth mapping relationship between an audio data size of the audio data and the literal content.

Specifically, the server may acquire the audio data and the literal content corresponding to the audio data. If the acquired raw data is audio data, then the audio data may be converted into the literal content by voice recognition. If the acquired raw data is literal content, then the literal content may be converted into the corresponding audio data. The specific process of conversion between the audio data and the literal content is an existing technology, and is not repeated any more here. The server may further acquire a fourth mapping relationship between an audio data size of the audio data and the literal content. For example, a mapping relationship between the literal content "a yellow warning for icy roads has been issued today in Xi'an. It is overcast to cloudy throughout the day. The temperature is −8° C. to 1° C. Severe pollution with an air quality index of 276" and the audio data size corresponding to the literal content is "(25 k, 5 words) (49 k, 9 words) . . . (220 k, 44 words)," which means that the first 5 words of the literal content correspond to the first 25K of the audio data size, and the first 9 words of the literal content correspond to the first 49 k of the audio data size, and so on, which is not repeated any more. It should be noted that, the granularity of the mapping relationship between the audio data size and the literal content may be set based on actual needs, such as using each word as the granularity, or using a plurality of words as the granularity, e.g., (5 k, 1 word) (10 k, 2 words), which is not specifically limited.

step 202: determining, based on the audio data and the fourth mapping relationship, the third mapping relationship between a duration of broadcasting the audio data and the literal content.

Specifically, the server may acquire a duration of broadcasting the audio data, specifically may obtain the duration of broadcasting the audio data by calculation based on the audio data size, and may acquire a mapping relationship between the duration of broadcasting and the audio data size, thereby further acquiring a third mapping relationship between the duration of broadcasting the audio data and the literal content.

Alternatively, the step 202 specifically may include:

step 2021: determining, based on the audio data size, a fifth mapping relationship between the duration of broadcasting the audio data and the audio data size.

As an example, the mapping relationship between the audio data size and the broadcast duration may be "(25 k, 100 ms) (49 k, 200 ms) . . . ."

step 2022: determining, based on the fourth mapping relationship and the fifth mapping relationship, the third mapping relationship between the duration of broadcasting the audio data and the literal content.

As an example, the third mapping relationship may be "(100 ms, 5 words) (200 ms, 9 words) . . . ."

As another implementable way, on the basis of the Embodiment 1, alternatively, the play image data includes: at least one of the image data or the literal data; if the play image data include the literal data, the method may further include: determining a second corresponding relationship between each line of the literal data in each of the groups and the attribute of the audio data, and sending the second corresponding relationship to the broadcast terminal, to enable the broadcast terminal to control synchronously playing the literal data in the each line and the audio data corresponding to the each line based on the second corresponding relationship.

Specifically, if the play image data includes the literal data, then the server may further determine the second corresponding relationship between each line of the literal data in each of the groups and the attribute of the audio data, and send the second corresponding relationship to the broadcast terminal, to enable the broadcast terminal to control synchronously playing the each line of the literal data and the audio data corresponding to the each line based on the second corresponding relationship. As an example, still taking the Xi'an weather as an example, if the literal content synchronous with the audio data needs to be displayed on a display interface, then the corresponding relationship between the literal data in each line and the attribute of the audio data being "(a yellow warning for icy roads has been issued today in Xi'an, 0-280 ms). (It is overcast to cloudy throughout the day, 280-300 ms) (The temperature is −8° C. to 1° C., 300-500 ms) . . . " may be determined. Each line of the literal data may be specifically determined by truncation based on punctuation marks in the literal content, or by truncation based on audio pauses in the audio data. The specific implementation may be any implementable way of the existing technologies, and is not repeated any more here.

It should be noted that, each implementable way in the embodiment may be implemented separately, or be implemented in any combination in case of no conflict, which is not limited in the disclosure.

Based on the Embodiment 1, the method for synchronously playing an image and an audio according to the embodiment may, if the play image data include literal data, further control synchronously playing the literal data in each line and the audio data, and may achieve a display effect, e.g., highlighting line by line, which helps a user in locating key information on the screen, thereby further improving the user experience. If the play image data include both the image data and the literal data, then accurately synchronously playing the three, i.e. voices, characters, and images can be achieved, to further improve the user experience.

Embodiment 3

The embodiment provides a method for synchronously playing an image and an audio, for synchronously playing an audio broadcast and a displayed content in a play service, and improving the accuracy in synchronization. The executive subject in the embodiment may be a broadcast terminal. The broadcast terminal specifically may include, but is not limited to, a screen-bearing smart speaker, a smart phone, a tablet computer, and the like.

Figure 4:
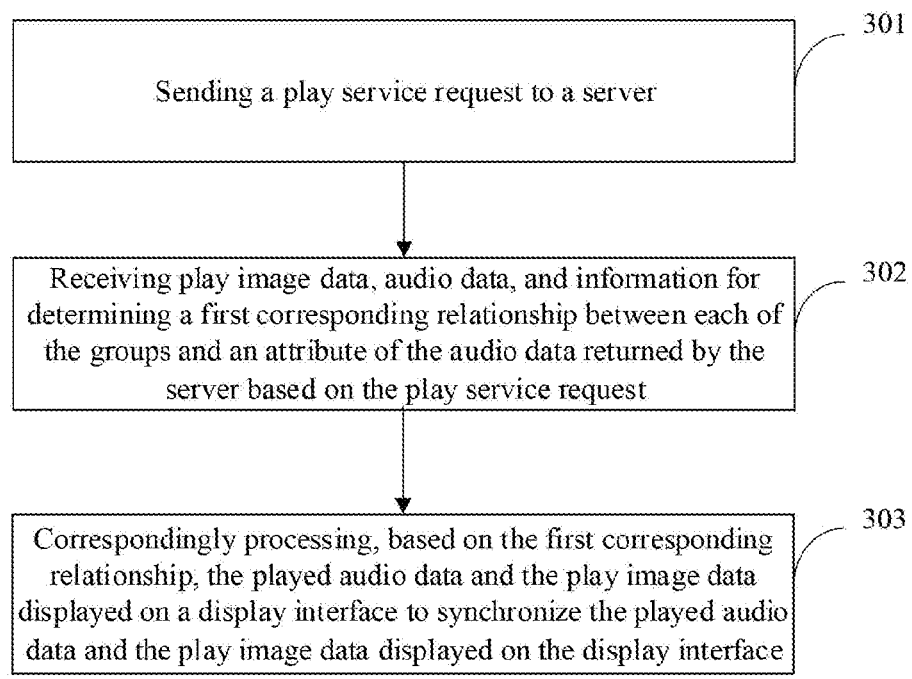
FIG. 4 is a schematic diagram of a flow of a method for synchronously playing an image and an audio according to a third embodiment of the disclosure.

FIG. 4 shows a schematic diagram of a flow of a method for synchronously playing an image and an audio according to the embodiment. The method includes:

step 301: sending a play service request to a server.

Specifically, when requiring a broadcast service, a user may input a play service request into a broadcast terminal using an input approach, such as voice input or manual character input. The broadcast terminal sends the play service request to a server. The server may acquire the play service request sent by the broadcast terminal.

step 302: receiving play image data, audio data, and information for determining a first corresponding relationship between each of the groups and an attribute of the audio data returned by the server based on the play service request.

The play image data are divided into a plurality of groups based on played content.

step 303: performing, based on the first corresponding relationship, synchronization on the played audio data and the play image data displayed on a display interface correspondingly.

Specifically, when the audio data are played, a corresponding play image is synchronously displayed on a display interface based on the corresponding relationship between each of the groups and the attribute of the audio data.

As an example, in a process of broadcasting "a yellow warning for icy roads has been issued today in Xi'an," an image associated with the warning is displayed on the display interface, and "warning" and other prompt messages may be further displayed on the displayed image, to enable users to be clearer about what is the content of the current display image. When completing broadcasting the above-mentioned content and beginning to broadcast "It is overcast to cloudy throughout the day. The temperature is −8° C. to 1° C.," an image associated with the temperature, as well as a prompt message of "temperature," and so on, is displayed on the display interface.

The method for synchronously playing an image and an audio provided by the embodiment synchronously processes played audio data and play image data displayed on a display interface correspondingly based on the first corresponding relationship between each of the groups and the attribute of the audio data returned by a server. Establishing the corresponding relationship between the audio data and the played content in each of the groups enables a broadcast terminal to accurately synchronize the broadcast audio data and the displayed play image during playing, thereby improving the accuracy in synchronizing audio broadcast and screen display.

Embodiment 4

The embodiment provides further supplementary description on the method for synchronously playing an image and an audio according to the Embodiment 3.

Figure 5:
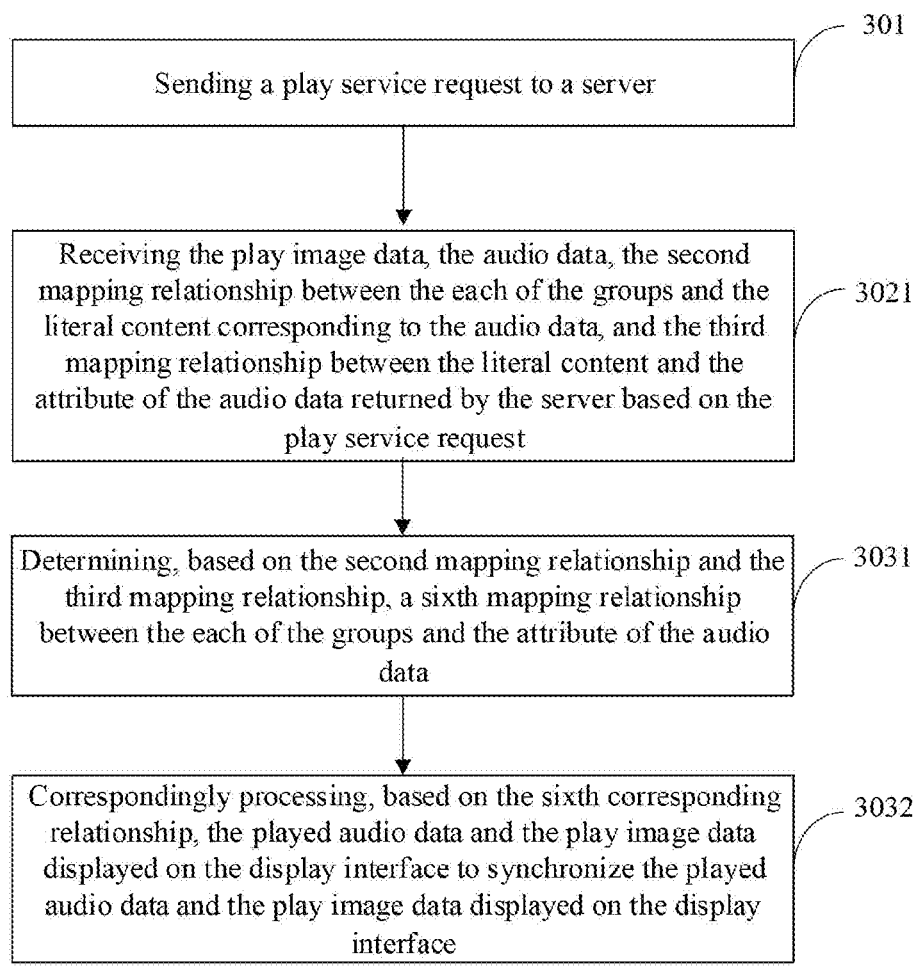
FIG. 5 is a schematic diagram of a flow of a method for synchronously playing an image and an audio according to a fourth embodiment of the disclosure.

FIG. 5 shows a schematic diagram of a flow of a method for synchronously playing an image and an audio according to the embodiment. The schematic diagram of the flow only provides an example of an integrated processing procedure, rather than limiting the disclosure, and may exclude a step or some steps in practical application. The order of the steps may also be different from the process based on the actual situation.

As an implementable way, on the basis of the Embodiment 3, alternatively, the information for determining the first corresponding relationship between the each of the groups and the attribute of the audio data includes: the first mapping relationship between the each of the groups and the attribute of the audio data; and then the step 303 includes: performing, based on the first corresponding relationship, synchronization on the played audio data and the play image data displayed on the display interface correspondingly. Specifically, a server determines the first corresponding relationship between the each of the groups and the attribute of the audio data, and sends the first corresponding relationship to a broadcast terminal. The broadcast terminal may correspondingly perform synchronization on the played audio data and the play image data displayed on the display interface directly based on the first corresponding relationship Alternatively, the information for determining the first corresponding relationship between the each of the groups and the attribute of the audio data includes: the second mapping relationship between the each of the groups and the literal content corresponding to the audio data, and the third mapping relationship between the literal content and the attribute of the audio data; and then the step 302 specifically includes:

step 3021: receiving the play image data, the audio data, the second mapping relationship between the each of the groups and the literal content corresponding to the audio data, and the third mapping relationship between the literal content and the attribute of the audio data returned by the server based on the play service request.

Then the step 303 includes:

step 3031: determining, based on the second mapping relationship and the third mapping relationship, a sixth mapping relationship between the each of the groups and the attribute of the audio data.

step 3032: performing, based on the sixth corresponding relationship, synchronization on the played audio data and the play image data displayed on the display interface correspondingly.

Specifically, the server determines the second mapping relationship between the each of the groups and the literal content corresponding to the audio data, and the third mapping relationship between the literal content and the attribute of the audio data, and sends the second mapping relationship and the third mapping relationship to the broadcast terminal. The broadcast terminal determines a sixth mapping relationship between the each of the groups and the attribute of the audio data based on the second mapping relationship and the third mapping relationship, and further correspondingly performing synchronization on the played audio data and the play image data displayed on the display interface based on the sixth mapping relationship.

Alternatively, the step 3032 specifically may include:

step 30321: timing the each of the groups, for the play image data played on the display interface, to control the each of the groups and the audio data corresponding to the each of the groups to be played synchronously.

Specifically, the mapping relationship between the each of the groups and the attribute of the audio data may be a corresponding relationship between the each of the groups and a duration of broadcasting the audio data, and the each of the groups is timed, for the play image data played on the display interface, to control play image of the each of the groups and the audio data based on the corresponding relationship between the each of the groups and the duration of broadcasting the audio data.

As another implementable way, on the basis of the Embodiment 3, optionally, the method may further include:

step 401: receiving a second corresponding relationship between each line of literal data in each of the groups sent by the server and the attribute of the audio data.

step 402: timing the each line, for the literal data played on the display interface, based on the second corresponding relationship, to control the each line of literal data and the audio data corresponding to the each line to be played synchronously.

Specifically, if the play image data include the literal data, and the broadcast terminal receives the second corresponding relationship between the each line of literal data in the each of the groups and the attribute of the audio data sent by the server, then the broadcast terminal may time the each line, for the literal data played on the display interface, based on the second corresponding relationship, to control the each line of literal data and the audio data corresponding to the each line to be played synchronously. For example, when broadcasting "a yellow warning for icy roads has been issued today in Xi'an" by voice, characters "a yellow warning for icy roads has been issued today in Xi'an" are synchronously displayed on the display interface. As will be appreciated, if the play image data include the image data and the literal data, the broadcast terminal may simultaneously control the audio data, and the image data and the literal data displayed on the display interface to be played synchronously.

Alternatively, the method may further include: controlling the line of literal data corresponding to currently played audio data to be displayed in a way different from other lines of literal data.

Specifically, the line of literal data corresponding to the currently played audio data may be controlled, and highlighted on the display interface, or displayed in a color different from other lines of literal data.

Figure 6:
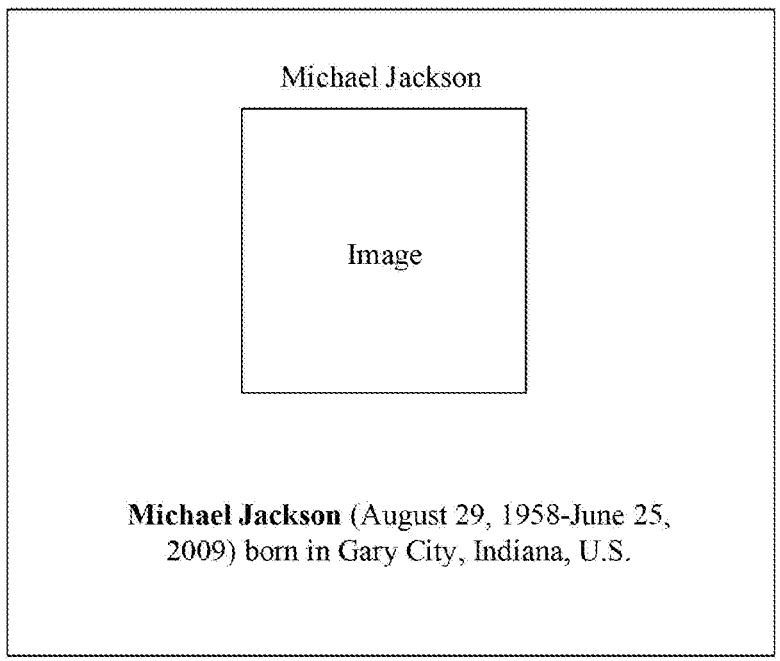
FIG. 6 is a schematic diagram of highlighting line by line according to an embodiment of the disclosure.

As an example, FIG. 6 shows a schematic diagram of highlighting line by line according to an embodiment. The image may be a photo of Michael Jackson or a video associated with him, which is merely illustrative description here.

Alternatively, each character broadcasted in an audio may be controlled based on a fine-grained corresponding relationship between the audio data and the literal data, i.e., a corresponding relationship between the duration of broadcasting the audio data and each character in a line, and be displayed on the display interface in a way different from characters in other lines and other characters in this line, i.e., literally highlighted.

Alternatively, the display interface may also be controlled to literally display each line of characters are not displayed currently on the display interface by scrolling down. Furthermore, the each line of characters may be highlighted, or displayed in different colors.

Figure 7:
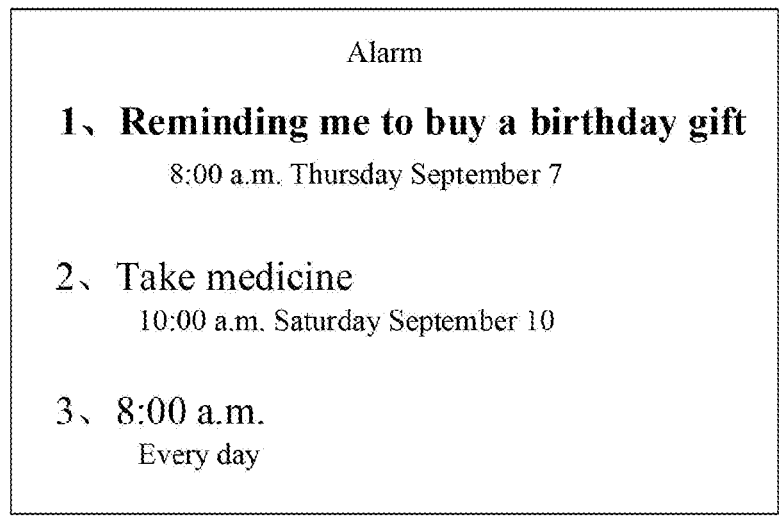
FIG. 7 is a schematic diagram of interfaces of highlighted display and scroll down according to an embodiment of the disclosure.
Figure 7:
Figure 7:
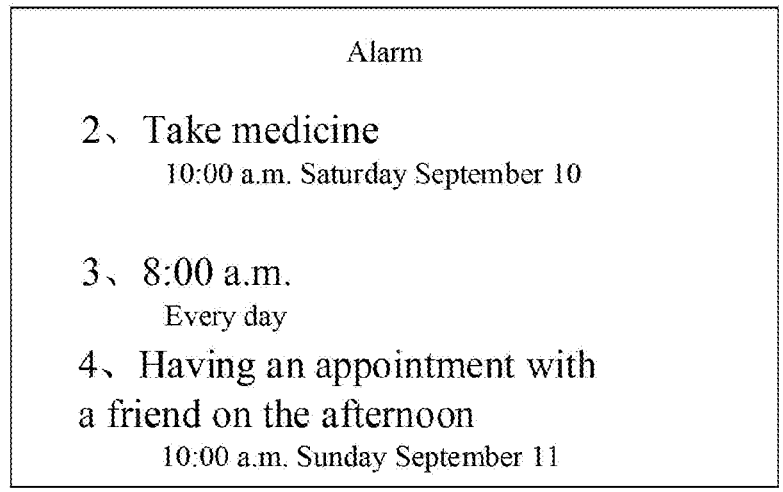
Figure 8:
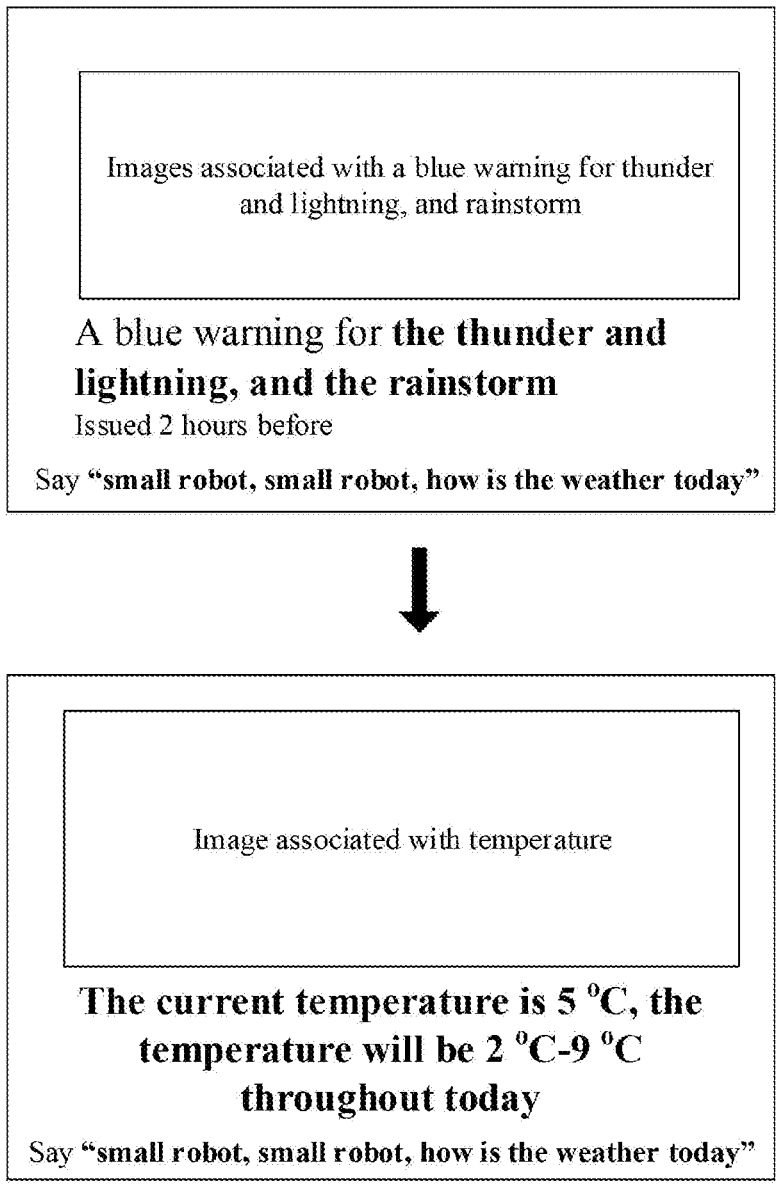
FIG. 8 is a schematic diagram of an interface of synchronous broadcast and page down according to an embodiment of the disclosure.

As an example, FIG. 7 shows a schematic diagram of interfaces of highlighted display and scroll down according to the embodiment. After completing broadcasting a 1st reminder of "reminding me to buy a birthday gift," a 4th reminder is revealed by scrolling down, and accordingly, the 1st reminder is scrolled out of the display interface, i.e., 2nd, 3rd, and 4th reminders are displayed on the display interface. FIG. 8 shows a schematic diagram of an interface of synchronous broadcast by paging down according to the embodiment. When broadcasting content associated with blue warning for thunder and lightning, and rainstorm, the thunder and lightning, and the rainstorm are highlighted, the words "blue warning" may be expressed in blue, and images associated with the thunder and lightning, and the rainstorm are synchronously displayed. When broadcasting content associated with current temperature, "the current temperature is 5° C., the temperature will be 2° C.-9° C. throughout today" is highlighted, and the page is turned to an image associated with the temperature synchronously.

It should be noted that, each implementable way in the embodiment may be implemented separately, or be implemented in any combination in case of no conflict, which is not limited in the disclosure.

Based on the Embodiment 3, the method for synchronously playing an image and an audio according to the embodiment may, if the play image data include literal data, further control the each line of literal data and the audio data to be played synchronously, may control the line of literal data corresponding to currently played audio data to be displayed in a way different from other lines of literal data, and may achieve a display effect, e.g., highlighting line by line, which helps a user in locating key information on the screen, thereby further improving the user experience.

Embodiment 5

The embodiment provides a server, for executing the method for synchronously playing an image and an audio according to the Embodiment 1.

Figure 9:
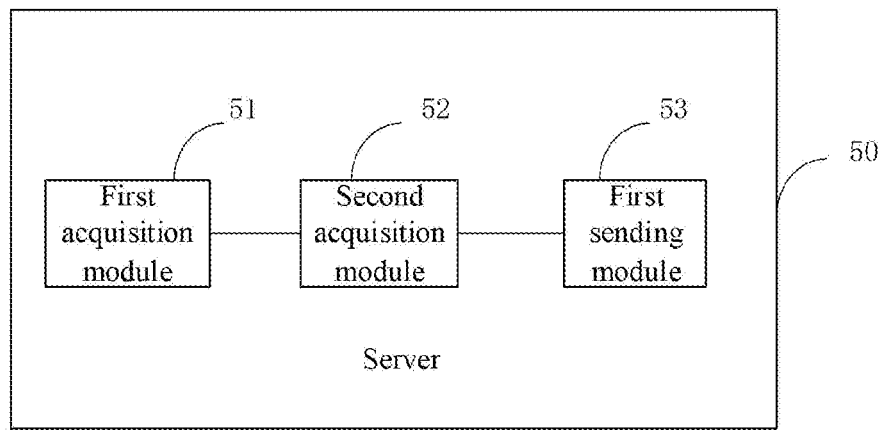
FIG. 9 is a schematic diagram of a structure of a server according to an embodiment of the disclosure.

FIG. 9 shows a schematic diagram of a structure of a server according to the embodiment. The server 50 includes a first acquisition module 51, a second acquisition module 52, and a first sending module 53.

The first acquisition module 51 is used for acquiring a play service request sent by a broadcast terminal; the second acquisition module 52 is used for acquiring play image data and audio data corresponding to the play service request, the play image data being divided into a plurality of groups based on played content; and the first sending module 53 is used for sending the play image data, the audio data, and information for determining a first corresponding relationship between each of the groups and an attribute of the audio data to the broadcast terminal, to enable the broadcast terminal to correspondingly perform synchronization on the play image data and the audio data based on the first corresponding relationship correspondingly to synchronously play the play image data and the audio data.

For the server in the embodiment, the specific mode for executing operations by each module has been described in detail in the embodiments associated with the method, and will not be described in detail here.

The server provided by the embodiment divides play image data into a plurality of groups based on played content, and sends information for determining a first corresponding relationship between each of the groups and the attribute of the audio data to a broadcast terminal, to enable the broadcast terminal to correspondingly perform synchronization on the play image data and the audio data based on the first corresponding relationship to synchronously play the play image data and the audio data. Establishing the corresponding relationship between the audio data and the played content of the each of the groups enables the broadcast terminal to accurately synchronize the broadcast audio data and the displayed play image during playing, thereby improving the accuracy in synchronizing audio broadcast and screen display.

Embodiment 6

The embodiment provides further supplementary description on the server provided in the Embodiment 5, for executing the method for synchronously playing an image and an audio according to the Embodiment 2.

As an implementable way, on the basis of the Embodiment 5, alternatively, the information for determining the first corresponding relationship between the each of the groups and the attribute of the audio data includes: a first mapping relationship between the each of the groups and the attribute of the audio data; or a second mapping relationship between the each of the groups and literal content corresponding to the audio data, and a third mapping relationship between the literal content and the attribute of the audio data.

Alternatively, the first sending module 53 may be further used for sending the literal content corresponding to the audio data to the broadcast terminal.

Alternatively, the server 50 may further include a third acquisition module and a fourth acquisition module.

The third acquisition module is used for acquiring a fourth mapping relationship between an audio data size of the audio data and the literal content based on the literal content; and the fourth acquisition module is used for determining the third mapping relationship between a duration of broadcasting the audio data and the literal content based on the audio data and the fourth mapping relationship.

Alternatively, the fourth acquisition module specifically may include a first acquisition submodule and a second acquisition submodule.

The first acquisition submodule is used for determining a fifth mapping relationship between the duration of broadcasting the audio data and the audio data size based on the audio data size; and the second acquisition submodule is used for determining the third mapping relationship between the duration of broadcasting the audio data and the literal content based on the fourth mapping relationship and the fifth mapping relationship.

As another implementable way, on the basis of the Embodiment 5, alternatively, the play image data include: at least one of image data or literal data.

If the play image data include the literal data, then the server 50 may further include a first determining module.

The first determining module is used for determining a second corresponding relationship between each line of literal data in the each of the groups and the attribute of the audio data.

For the server in the embodiment, the specific mode for executing operations by each module has been described in detail in the embodiments associated with the method, and will not be described in detail here.

It should be noted that, each implementable way in the embodiment may be implemented separately, or be implemented in any combination in case of no conflict, which is not limited in the disclosure.

Based on the Embodiment 5, the server according to the embodiment may, if the play image data include literal data, further control the each line of literal data and audio data to be displayed synchronously, and may achieve a display effect, such as highlighting line by line, which helps a user in locating key information on the screen, thereby further improving the user experience. If the play image data include both the image data and the literal data, then accurately synchronously playing the three, i.e. voices, characters, and images can be achieved, to further improve the user experience.

Embodiment 7

The embodiment provides a broadcast terminal, for executing the method for synchronously playing an image and an audio according to the Embodiment 3.

Figure 10:
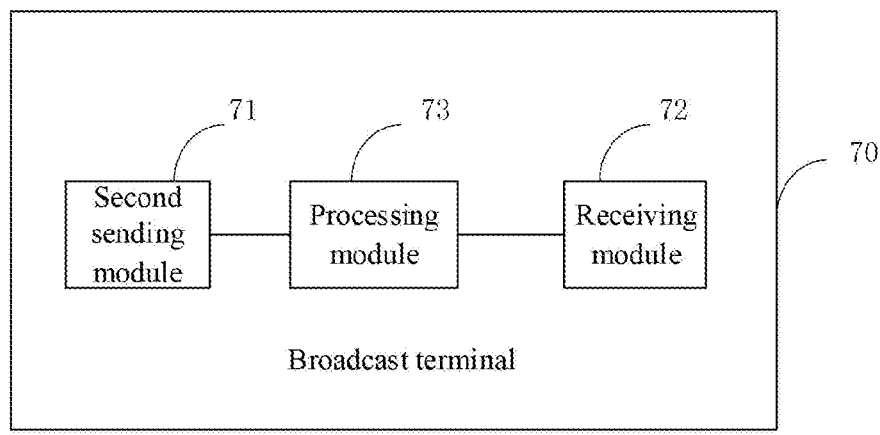
FIG. 10 is a schematic diagram of a structure of a broadcast terminal according to an embodiment of the disclosure.

FIG. 10 shows a schematic diagram of a structure of the broadcast terminal according to the embodiment. The broadcast terminal 70 includes a second sending module 71, a receiving module 72, and a processing module 73.

The second sending module 71 sends a play service request to a server; the receiving module 72 is used for receiving play image data, audio data, and information for determining a first corresponding relationship between each of a plurality of groups and an attribute of the audio data returned by a server based on the play service request, the play image data being divided into a plurality of groups based on played content; and the processing module 73 is used for performing, based on the first corresponding relationship, synchronization on the played audio data and the play image data displayed on a display interface correspondingly.

For the broadcast terminal in the embodiment, the specific mode for executing operations by each module has been described in detail in the embodiments associated with the method, and will not be described in detail here.

The broadcast terminal provided by the embodiment correspondingly perform synchronization on played audio data and play image data displayed on a display interface based on a first corresponding relationship between each of the groups and the attribute of the audio data returned by a server. Establishing the corresponding relationship between the audio data and the played content of the each of the groups enables the broadcast terminal to accurately synchronize the broadcast audio data and the displayed play image during playing, thereby improving the accuracy in synchronizing audio broadcast and screen display.

Embodiment 8

The embodiment provides further supplementary description on the server provided in the Embodiment 7, for executing the method for synchronously playing an image and an audio according to the Embodiment 4.

As an implementable way, on the basis of the Embodiment 7, alternatively, the processing module 73 specifically may be used for: if the information for determining the first corresponding relationship between the each of the groups and the attribute of the audio data includes a first mapping relationship between the each of the groups and the attribute of the audio data, performing synchronization on the played audio data and the play image data displayed on the display interface correspondingly based on the first mapping relationship; determining, if the information for determining the first corresponding relationship between the each of the groups and the attribute of the audio data includes a second mapping relationship between the each of the groups and literal content corresponding to the audio data and a third mapping relationship between the literal content and the attribute of the audio data, a sixth mapping relationship between the each of the groups and the attribute of the audio data based on the second mapping relationship and the third mapping relationship; and performing synchronization on the played audio data and the play image data displayed on the display interface correspondingly based on the sixth mapping relationship.

Alternatively, the processing module specifically may be used for: timing each of the groups, for the play image data played on the display interface, to control the each of the groups and the audio data corresponding to the each of the groups to be played synchronously.

As another implementable way, on the basis of the Embodiment 7, alternatively, the receiving module may be further used for receiving a second corresponding relationship between each line of literal data in the each of the groups and the attribute of the audio data sent by the server.

The processing module is further used for timing each line, for the literal data played on the display interface, based on the second corresponding relationship, to control the each line of literal data and the audio data corresponding to the each line to be played synchronously.

Alternatively, the broadcast terminal may further include a control module, for controlling the line of literal data corresponding to currently played audio data to be displayed in away different from other lines of literal data.

For the broadcast terminal in the embodiment, the specific mode for executing operations by each module has been described in detail in the embodiments associated with the method, and will not be described in detail here.

It should be noted that, each implementable way in the embodiment may be implemented separately, or be implemented in any combination in case of no conflict, which is not limited in the disclosure.

Based on the Embodiment 7, the broadcast terminal according to the embodiment may, if the play image data include literal data, further control the literal data in each line and audio data to be displayed synchronously, may control the line of literal data corresponding to currently played audio data to be displayed in a way different from other lines of literal data, and may achieve a display effect, e.g., highlighting line by line, which helps a user in locating key screen information, thereby further improving the user experience.

Embodiment 9

The embodiment provides a server, for executing the method according to the Embodiment 1 or the Embodiment 2.

Figure 11:
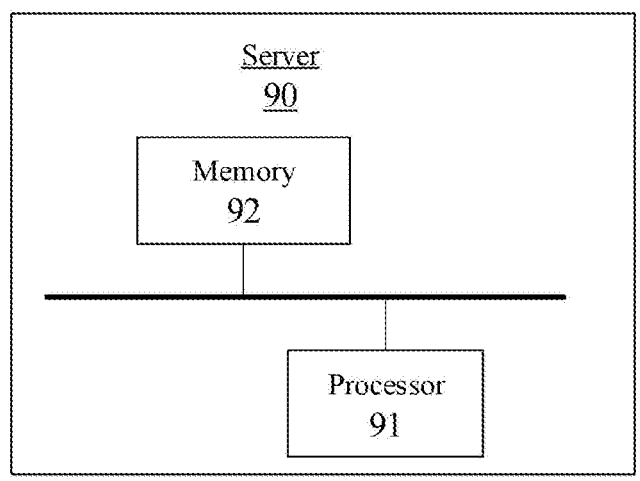
FIG. 11 is a schematic diagram of a structure of a server according to another embodiment of the disclosure.

FIG. 11 shows a schematic diagram of a structure of a server according to the embodiment. The server 90 includes: at least one processor 91, and a memory 92.

The memory stores a computer program; and the at least one processor executes the computer program stored in the memory, to implement the method according to the Embodiment 1 or the Embodiment 2.

The server provided by the embodiment divides play image data into a plurality of groups based on played content, and sends information for determining a first corresponding relationship between each of the groups and attribute of the audio data to a broadcast terminal, to enable the broadcast terminal to perform synchronization on the play image data and the audio data correspondingly based on the first corresponding relationship. Establishing the corresponding relationship between the audio data and the played content of the each of the groups enables the broadcast terminal to accurately synchronize the broadcast audio data and the displayed play image during playing, thereby improving the accuracy in synchronizing audio broadcast and screen display.

Embodiment 10

The embodiment provides a broadcast terminal, for executing the method according to the Embodiment 3 or the Embodiment 4.

Figure 12:
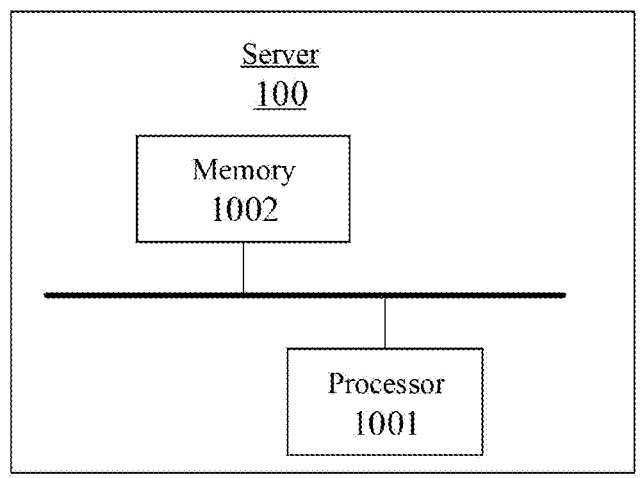
FIG. 12 is a schematic diagram of a structure of a broadcast terminal according to another embodiment of the disclosure.

FIG. 12 shows a schematic diagram of a structure of the broadcast terminal according to the embodiment. The broadcast terminal 100 includes: a processor 1001, and a memory 1002.

The memory stores a computer program; and the processor executes the computer program stored in the memory, to implement the method according to the Embodiment 3 or the Embodiment 4.

The broadcast terminal provided by the embodiment performs synchronization on the played audio data and play image data displayed on a display interface correspondingly based on a first corresponding relationship between each of the groups and the attribute of the audio data returned by a server. Establishing the corresponding relationship between the audio data and the played content of the each of the groups enables the broadcast terminal to accurately synchronize the broadcast audio data and the displayed play image during playing, thereby improving the accuracy in synchronizing audio broadcast and screen display.

Embodiment 11

The embodiment provides a computer readable storage medium, the computer readable storage medium storing a computer program therein, the computer program implementing, when executed, the method according to the Embodiment 1 or the Embodiment 2.

Embodiment 12

The embodiment provides a computer readable storage medium, the computer readable storage medium storing a computer program therein, the computer program implementing, when executed, the method according to the Embodiment 3 or the Embodiment 4.

According to a few embodiments provided by the disclosure, it shall be understood that the disclosed apparatus and method may by implemented in other ways. For example, the embodiments of the preceding apparatus are merely illustrative. For example, the units are divided only by logical functions, and may be divided additionally in actual implementation. For example, a plurality of units or components may be combined or integrated into another system, or some features may be ignored or not executed. Besides, the revealed or discussed mutual coupling or direct coupling or communication link may be indirect coupling or communication link through some interfaces, apparatuses, or units, and may be electrical, mechanical, or in other forms.

The units described as separate components may be or not be physically separated, and the components shown as a unit may be or not be a physical unit, i.e., may be located in one place, or be distributed to a plurality of network units. According to actual needs, parts or all of the units therein may be selected to achieve the goal of the solution of the embodiment.

In addition, the functional units according to the embodiments of the disclosure may be integrated into a processing unit, or each unit may separately physically exist, or two or more units may be integrated into one unit. The integrated unit may be implemented in the form of hardware, or be implemented in the form of hardware with the addition of a software function unit.

The integrated unit implemented in the form of a software function unit may be stored in a computer readable storage medium. The software function unit is stored in a storage medium, including a plurality of instructions for enabling a computer device (may be a personal computer, a server, or a network device, etc.) or a processor to execute some steps of the method according to the embodiments of the disclosure. The preceding storage medium includes: media capable of storing program codes, such as U disk, mobile HDD, read-only memory (ROM), random access memory (RAM), magnetic disk, or optical disk.

Those skilled in the art may clearly understand that, for convenience and brevity of description, only the division of the functional modules is illustrated. In practical application, the functional allocation may be completed by different functional modules as required, i.e., dividing the internal structure of the apparatus into different functional modules to complete all or parts of the preceding functions. The corresponding process in the preceding embodiments of the method may be referred to for specific working process of the preceding apparatus, which is not repeated any more here.

Finally, it should be noted that: the above embodiments are only presented to show the technical solutions of the disclosure, rather than to limit them. The disclosure is described in detail with reference to the preceding embodiments, but those skilled in the art shall understand that: they still can modify the technical solutions disclosed in the preceding embodiments, or equivalently replace parts or all of the technical characteristics thereof; and the modifications or replacements do not cause the essence of corresponding technical solutions to depart from the scope of the technical solutions according to the embodiments of the disclosure.

What is claimed is:

1. A method for synchronously playing an image and an audio, comprising:
    acquiring a play service request sent by a broadcast terminal;
    acquiring play image data and audio data corresponding to the play service request, the play image data being divided into a plurality of groups based on played content; and
    sending the play image data, the audio data, and information for determining a first corresponding relationship between each of the groups and an attribute of the audio data to the broadcast terminal, to enable the broadcast terminal to perform, based on the first corresponding relationship, synchronization on the play image data and the audio data correspondingly to synchronously play the play image data and the audio data,
    wherein the play image data comprise at least one of image data or literal data; and
    in response to the play image data including the literal data, the method further comprises:
    determining a second corresponding relationship between each line of literal data in the each of the groups and the attribute of the audio data, and sending the second corresponding relationship to the broadcast terminal.

2. The method according to claim 1, wherein the information for determining a first corresponding relationship between each of the groups and an attribute of the audio data comprises:
    a first mapping relationship between the each of the groups and the attribute of the audio data; or
    a second mapping relationship between the each of the groups and literal content corresponding to the audio data, and a third mapping relationship between the literal content and the attribute of the audio data.

3. The method according to claim 2, further comprising:
    sending the literal content corresponding to the audio data to the broadcast terminal.

4. The method according to claim 2, wherein before the sending the play image data, the audio data, and information for determining a first corresponding relationship between each of the groups and an attribute of the audio data to the broadcast terminal, the method further comprises:
    acquiring, based on the literal content, a fourth mapping relationship between an audio data size of the audio data and the literal content; and
    determining, based on the audio data and the fourth mapping relationship, the third mapping relationship between a duration of broadcasting the audio data and the literal content.

5. The method according to claim 4, wherein the determining, based on the audio data and the fourth mapping relationship, the third mapping relationship between a duration of broadcasting the audio data and the literal content comprises:
    determining, based on the audio data size, a fifth mapping relationship between the duration of broadcasting the audio data and the audio data size; and
    determining, based on the fourth mapping relationship and the fifth mapping relationship, the third mapping relationship between the duration of broadcasting the audio data and the literal content.

6. A method for synchronously playing an image and an audio, comprising:
    sending a play service request to a server, and receiving play image data, audio data, and information for determining a first corresponding relationship between each of a plurality of groups and an attribute of the audio data returned by the server based on the play service request, the play image data being divided into the plurality of groups based on played content; and
    performing, based on the first corresponding relationship, synchronization on the played audio data and the play image data displayed on a display interface correspondingly, the method further comprising:
receiving a second corresponding relationship between each line of literal data in the each of the groups and the attribute of the audio data sent by the server; and
controlling, based on the second corresponding relationship, the each line of literal data and the audio data corresponding to the each line to be played synchronously.

7. The method according to claim 6, wherein
the information for determining a first corresponding relationship between each of a plurality of groups and an attribute of the audio data comprises a first mapping relationship between the each of the groups and the attribute of the audio data; then the performing, based on the first corresponding relationship, synchronization on the played audio data and the play image data displayed on a display interface correspondingly comprises:
performing, based on the first mapping relationship, synchronization on the played audio data and the play image data displayed on the display interface correspondingly; or
the information for determining a first corresponding relationship between each of a plurality of groups and an attribute of the audio data comprises: a second mapping relationship between the each of the groups and literal content corresponding to the audio data, and a third mapping relationship between the literal content and the attribute of the audio data; then the performing, based on the first corresponding relationship, synchronization on the played audio data and the play image data displayed on a display interface correspondingly comprises:
determining, based on the second mapping relationship and the third mapping relationship, a sixth mapping relationship between the each of the groups and the attribute of the audio data; and
performing, based on the sixth mapping relationship, synchronization on the played audio data and the play image data displayed on the display interface correspondingly.

8. The method according to claim 7, wherein the performing, based on the sixth mapping relationship, synchronization on the played audio data and the play image data displayed on the display interface correspondingly comprises:
timing the each of the groups, for the play image data played on the display interface, to control the each of the groups and the audio data corresponding to the each of the groups to be played synchronously.

9. The method according to claim 8, further comprising:
timing each line, for the literal data played on the display interface, based on the second corresponding relationship, to control the each line of literal data and the audio data corresponding to the each line to be played synchronously.

10. The method according to claim 9, further comprising:
controlling the line of literal data corresponding to currently played audio data to be displayed in a way different from other lines of literal data.

11. A server, comprising:
at least one processor; and
a memory storing instructions, the instructions when executed by the at least one processor, cause the at least one processor to perform operations, the operations comprising:

acquiring a play service request sent by a broadcast terminal;
acquiring play image data and audio data corresponding to the play service request, the play image data being divided into a plurality of groups based on played content; and
sending the play image data, the audio data, and information for determining a first corresponding relationship between each of the groups and an attribute of the audio data to the broadcast terminal, to enable the broadcast terminal to perform, based on the first corresponding relationship, synchronization on the play image data and the audio data correspondingly to synchronously play the play image data and the audio data,
wherein the play image data comprise: at least one of image data or literal data; and
in response to the play image data including the literal data, then the operations further comprise:
determining a second corresponding relationship between each line of literal data in the each of the groups and the attribute of the audio data; and
sending the second corresponding relationship to the broadcast terminal.

12. The server according to claim 11, wherein the information for determining a first corresponding relationship between each of the groups and an attribute of the audio data comprises:
a first mapping relationship between the each of the groups and the attribute of the audio data; or
a second mapping relationship between the each of the groups and literal content corresponding to the audio data, and a third mapping relationship between the literal content and the attribute of the audio data.

13. The server according to claim 12, wherein the first sending module is further used for sending the literal content corresponding to the audio data to the broadcast terminal.

14. The server according to claim 12, wherein the operations further comprise:
acquiring, based on the literal content, a fourth mapping relationship between an audio data size of the audio data and the literal content; and
determining, based on the audio data and the fourth mapping relationship, the third mapping relationship between a duration of broadcasting the audio data and the literal content.

15. The server according to claim 14, wherein the determining, based on the audio data and the fourth mapping relationship, the third mapping relationship between a duration of broadcasting the audio data and the literal content comprises:
determining, based on the audio data size, a fifth mapping relationship between the duration of broadcasting the audio data and the audio data size; and
determining, based on the fourth mapping relationship and the fifth mapping relationship, the third mapping relationship between the duration of broadcasting the audio data and the literal content.

16. A broadcast terminal, comprising:
at least one processor; and
a memory storing instructions, the instructions when executed by the at least one processor, cause the at least one processor to perform operations according to claim 6.

17. The broadcast terminal according to claim 16, wherein the operations further comprise:

performing, based on the first corresponding relationship, synchronization on the played audio data and the play image data displayed on the display interface correspondingly, in response to the information for determining the first corresponding relationship between the each of the groups and the attribute of the audio data comprising the first mapping relationship between the each of the groups and the attribute of the audio data; and determining, in response to the information for determining the first corresponding relationship between the each of the groups and the attribute of the audio data comprising a second mapping relationship between the each of the groups and literal content corresponding to the audio data and a third mapping relationship between the literal content and the attribute of the audio data, a sixth mapping relationship between the each of the groups and the attribute of the audio data based on the second mapping relationship and the third mapping relationship; and performing, based on the sixth mapping relationship, synchronization on the played audio data and the play image data displayed on the display interface correspondingly.

18. The broadcast terminal according to claim 17, wherein the operations comprise:

timing the each of the groups, for the play image data played on the display interface, to control the each of the groups and the audio data corresponding to the each of the groups to be played synchronously.

19. The broadcast terminal according to claim 18, wherein the operations comprise:

receiving a second corresponding relationship between each line of literal data in the each of the groups and the attribute of the audio data sent by the server; and timing each line, for the literal data played on the display interface, based on the second corresponding relationship, to control the each line of literal data and the audio data corresponding to the each line to be played synchronously.

20. The broadcast terminal according to claim 19, wherein the operations further comprise:

controlling the line of literal data corresponding to currently played audio data to be displayed in a way different from other lines of literal data.

21. A non-transitory computer readable storage medium storing a computer program, wherein the computer program, when executed by a processor, cause the processor to perform operations according to claim 1.

22. A non-transitory computer readable storage medium storing a computer program, wherein the computer program, when executed by a processor, cause the processor to perform operations according to claim 6.

* * * * *